Nov. 10, 1931.   A. A. HAWKINSON   1,831,000
TIRE REPAIR PLUG
Filed Jan. 31, 1929   2 Sheets-Sheet 1
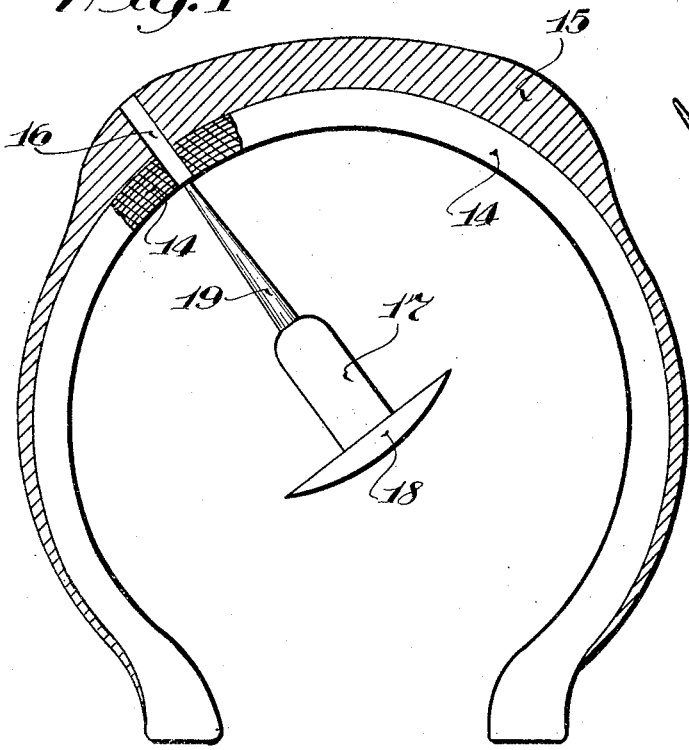
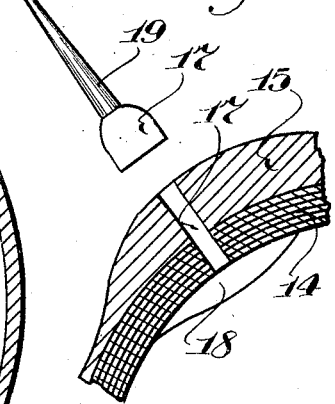
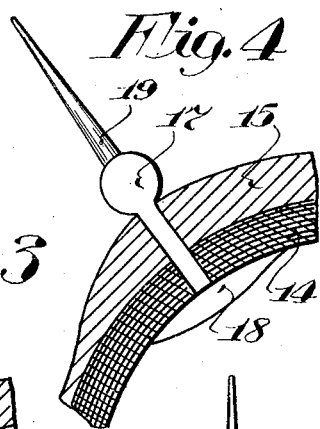
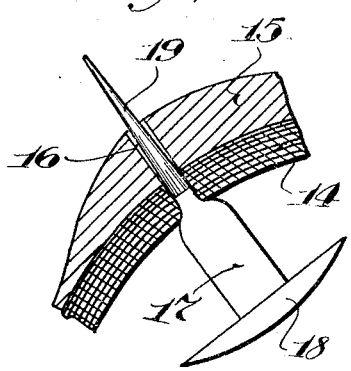
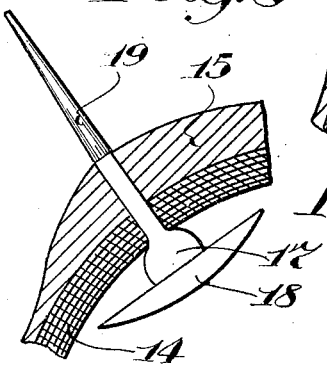
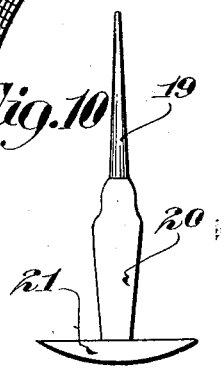
Inventor
Arthur A. Hawkinson
By his Attorneys

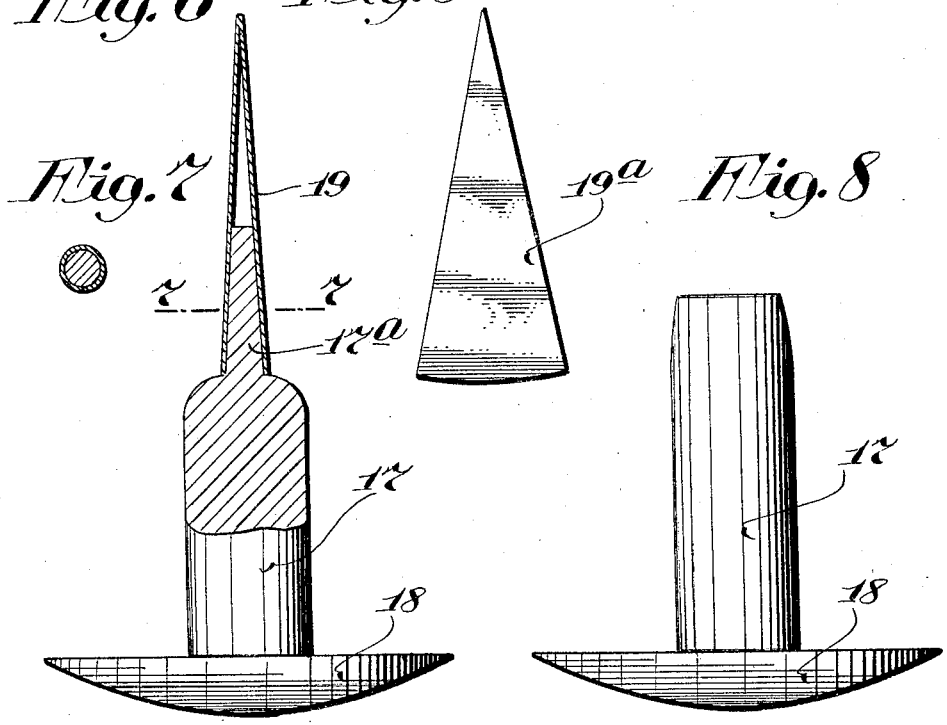
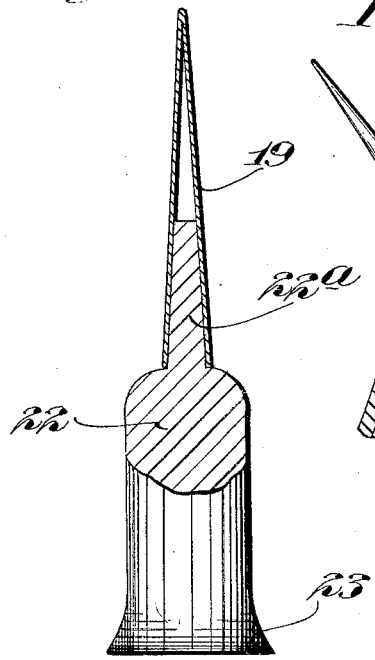
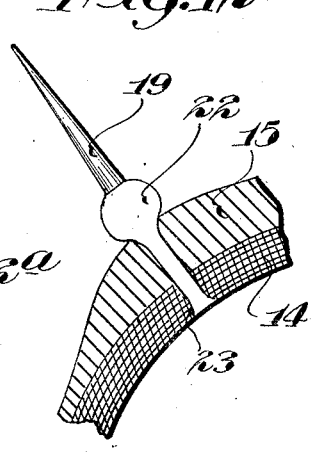
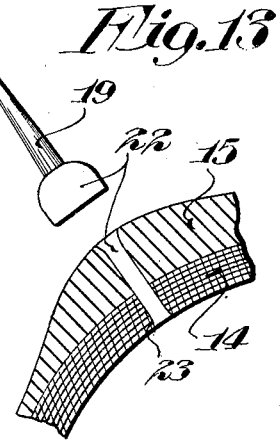

Patented Nov. 10, 1931

1,831,000

UNITED STATES PATENT OFFICE

ARTHUR A. HAWKINSON, OF MINNEAPOLIS, MINNESOTA

TIRE REPAIR PLUG

Application filed January 31, 1929. Serial No. 336,357.

This invention relates to plugs for repairing tire casings, and more particularly to the type of plug wherein a metallic quill or stem is used for drawing the plug through the puncture in the tire. My experiences and experiments have demonstrated the facts that the best type of repair plug should include a metallic inserting quill or stem of very much less diameter than the normal diameter of the plug, the manner of application of the quill to the plug and the relative diameters thereof being such that insertion of the quill will not enlarge the tire puncture and the drawing action of the quill on the plug will elongate the plug and decrease its diameter so that it may be drawn through the puncture and then, when released, the plug will longitudinally shorten and become diametrically enlarged to tightly close the puncture, all as will hereinafter more fully appear.

To accomplish the results above generally stated, it is necessary that the quill of relatively small diameter should be attached and anchored only to the reduced end portion of the plug. The portion of the plug that is adapted to fill the puncture will therefore, in all cases, be of very much greater diameter than that of the stem secured to the end thereof or of the puncture to be closed thereby and then, of course, it follows that the insertion of the plug into the puncture can be accomplished only by pulling and elongating the plug and thereby decreasing its diameter so that it can be drawn into and through the puncture.

The plug proper may take different forms, but in all cases its body portion, that is, that portion thereof that is to fill the puncture, will be normally in an undistorted condition and free for elongation and decrease in diameter to its elastic limit by stress put thereon in the act of pulling the plug through the puncture.

The invention is illustrated in the accompanying drawings, wherein like characters indicate like parts throughout the several views.

Referring to the drawings:

Fig. 1 shows the tire casing in transverse section and one of the improved plugs in position to be drawn into and through the puncture;

Figs. 2, 3, 4 and 5 are fragmentary views corresponding to Fig. 1, but progressively indicating steps in the operation of applying the plug to close a puncture;

Fig. 6 is an enlarged view of the plug showing the same partly in side elevation and partly in axial section;

Fig. 7 is a section taken on the line 7—7 of Fig. 6;

Fig. 8 shows the plug before the metallic quill has been applied thereto;

Fig. 9 is a plan view showing a flat triangular metallic strip from which the quill is made;

Fig. 10 is a plan view of a plug modified slightly as to the form of the body of the plug;

Fig. 11 is a view corresponding to Fig. 6, but showing the plug with little or no head formation; and Figs. 12 and 13 are views corresponding to Figs. 4 and 5, but showing the application of a plug of the form shown in detail in Fig. 11.

The numeral 14 indicates the fabric inner portion, and the numeral 15, the outer rubber or tread portion of an ordinary tire casing which casing is shown as having a puncture 16.

The body of the plug, which, as is customary, is of soft rubber 17, is in the form shown in Figs. 1, 2, 3, 4, 5, 6, 7 and 8, provided with a head 18 which forms a plug of so-called mushroom type.

The quill or stem 19 for drawing the plug through a puncture is preferably formed tapered and hollow from a triangular metallic sheet 19$^a$. In the rolling or formation of this quill, it is very tightly pressed and permanently anchored onto the end 17$^a$ of the elastic plug body 17, thereby diametrically reducing the said end 17$^a$ to a diameter very much less than that of the normal diameter of the plug, to wit: preferably to about one-third the normal diameter of said plug. If found necessary or desirable, cement may be applied to increase the grip between the stem and the diametrically reduced end of the plug.

Fig. 1 shows the plug ready for insertion through the puncture 16 in the tire casing; Fig. 2 shows the plug initially started into the puncture; Fig. 3 shows the plug partly drawn into the puncture; and Fig. 4 shows the plug completely drawn into the puncture. By reference to Fig. 4, it will be noted that the portion of the plug that has been drawn outward through the puncture, will naturally expand to substantially its normal diameter. After the plug is drawn to position, its outer portion should be cut off at a point below the stem or quill and approximately flush with the outer surface of the casing, as shown in Fig. 5, and when this is done, the puncture is completely closed and that portion of the plug that is within the puncture will be under very considerable compression and will very tightly close the puncture. Moreover, as the outer portion 15 of the casing is more flexible than the inner fabric portion 14, there will naturally be a slightly greater expansion of the plug within the said outer portion. In view of this tendency toward greater expansion in the outer portion of the casing, it may be desirable, in some instances, to form the plug with an outward flare, as illustrated in Fig. 10, wherein the plug 20 is larger at its outer portion than at its inner portion, or, otherwise stated, is tapered toward its head 21.

The plug 22 shown in Figs. 11, 12 and 13 is formed without a head proper, but is preferably formed with a flaring inner end 23. The metallic stem 19 in this form of the plug as in the plug previously described, is clamped securely onto the reduced outer end 22ª of the plug 22. Fig. 12 shows the plug illustrated in Fig. 11, drawn into the puncture of the tire casing, and Fig. 13 shows the outer portion of the plug cut off or severed from the compressed plug portion that fills the puncture.

In all of the plug structures above described, there is an attached threading stem for drawing the plug through the puncture; the stem is of such size that it will not increase the size of the puncture by stretching, tearing or distortion; the stem which is first projected through the puncture may be grabbed with the hands or with pliers to stretch and reduce the diameter of the body of the plug and to pull the same through the puncture; and the body of the plug that is to close the puncture, is always left uncovered so that it will be drawn into the puncture only as it is properly decreased in diameter by stretching while in contact with the walls of the puncture so that upon release of the intensive stress on the plug, the elastic plug body, by its own natural tension will become longitudinally shortened and diametrically enlarged to the extent permitted by the surrounding walls of the aperture or puncture and said plug, will form a perfect and very tight seal between the plug and the walls of the puncture. In actual practice, this plug has been found very highly efficient for the purposes stated. The threading stem, sometimes called a quill, may be made and applied on the reduced end of the plug in any suitable way other than that above particularly described, for example, the quill may be formed by taking a metallic tube of sufficient diameter telescoped over the normal unreduced end of the plug and then the quill can be reduced to proper size by compressing the same and the plug therein by swaging or rolling actions.

From the illustration and description above given, it is evident that the tubular stem or quill is connected to the body of the plug without cutting away or weakening the rubber of the plug at the place of connection, for in reducing the diameter of the end of the plug by the application of the stem thereto, the rubber is simply circumferentially reduced and therefore maintains in the reduced portion, substantially the same tensile strength as in the normal body of the plug. The tubular stem in the process of its contraction is simply pressed onto the end of the plug and the engaged end of the plug is reduced in diameter simultaneously with the stem by elongation which takes place under pressure. In this way also the best kind of a frictional contact is made between the tubular metallic stem and the elastic rubber plug. By reference to Fig. 2. it will be noted that in the initial action of drawing the plug through the puncture, the plug is stretched so that its diameter at the junction with the stem or quill is of approximately the same diameter, which greatly facilitates the drawing of the plug through the puncture.

What I claim is:

A tire plug comprising an elastic plug body having a metallic inserting stem permanently applied to one end thereof, the portion of the elastic plug body that is adapted to fill an aperture being exposed and normally in an undistorted condition so that it is free to be elongated and diametrically reduced to its elastic limit, and said stem being of very materially less diameter than the normal diameter of the portion of the plug body that is adapted to fill an aperture.

In testimony whereof I affix my signature.

ARTHUR A. HAWKINSON.